Feb. 14, 1928.
H. B. SPERRY
1,659,007
HARVESTER
Filed May 2, 1923
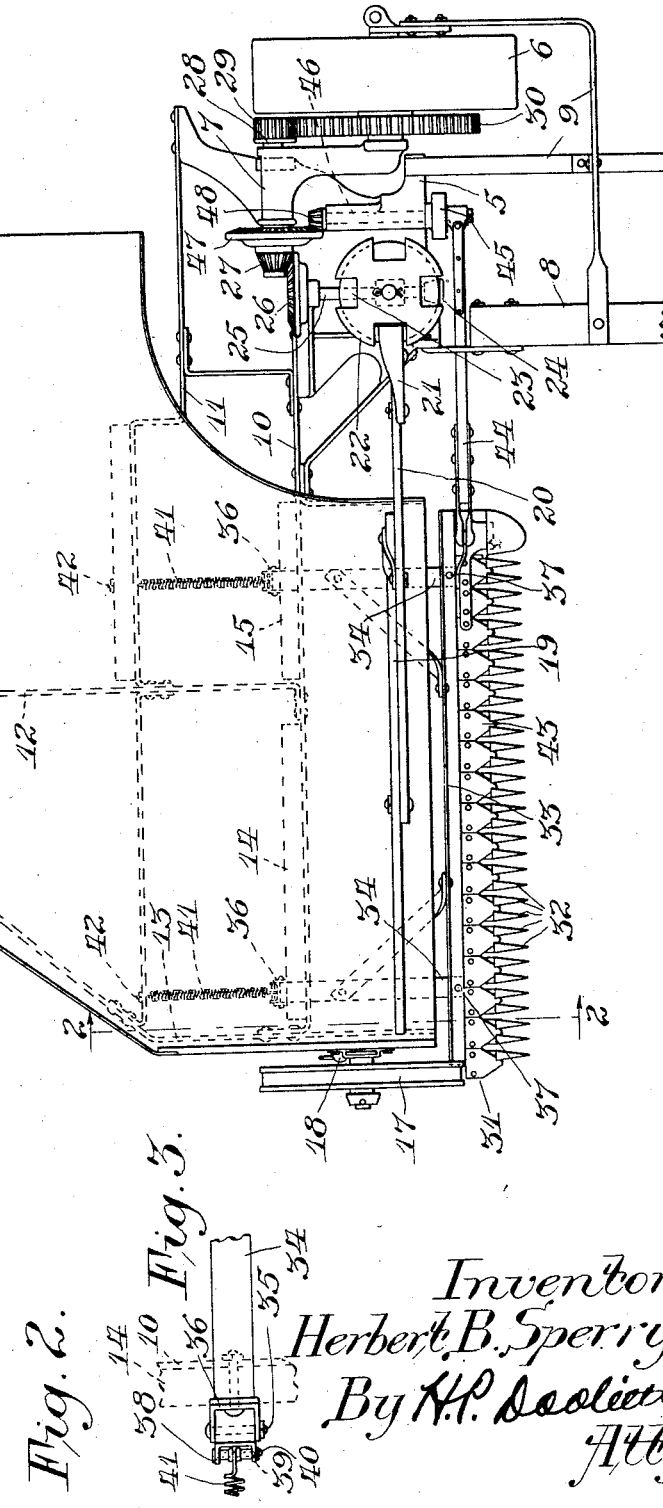
Inventor.
Herbert B. Sperry,
By H. P. Doolittle
Atty.

Patented Feb. 14, 1928.

1,659,007

UNITED STATES PATENT OFFICE.

HERBERT B. SPERRY, OF BATAVIA, ILLINOIS, ASSIGNOR TO INTERNATIONAL HARVESTER COMPANY, OF CHICAGO, ILLINOIS, A CORPORATION OF NEW JERSEY.

HARVESTER.

Application filed May 2, 1923. Serial No. 636,035.

My invention relates to harvesters and more particularly to an improved cutting and gathering mechanism for the same.

One of the objects of the present invention is to provide a floating cutting mechanism adapted for use in connection with a harvester platform.

A further object is to provide an improved cutting mechanism which will cut close to the ground in a manner to follow irregular surfaces of the ground independently of the harvester platform.

A still further object is to provide a gathering means to cooperate with my improved cutting mechanism in a manner to convey the crop cut by said cutting mechanism to said platform.

These and other objects are obtained by providing a construction and an arrangement of the various parts in the manner hereinafter described and particularly pointed out in the appended claims.

Referring to the drawings—

Fig. 1 is a top plan view of a harvester showing my improved cutting mechanism embodied therein;

Fig. 2 is a cross-sectional view taken on the line 2—2 in Fig. 1 showing the manner in which my improved cutting mechanism is pivoted to the underside of the harvester platform; and Fig. 3 is an enlarged fragmentary detail view showing the pivotal connection of the cutting mechanism to the harvester platform.

For the purposes of illustration, I have shown my improved cutting and gathering mechanism embodied in a harvester comprising the usual main frame member 5 adjustably mounted on the main or traction wheel 6 by means of a bracket 7. The harvester is provided with the usual tongue 8 and supplemental draft members 9. Extending laterally from the main frame 5 and secured thereto by means of bolts are platform supporting frame members 10 and 11. Extending longitudinally of and secured to the platform supporting members 10 and 11 are other platform frame members 12 and 13. Secured to the rear of the platform supporting member 10 are transversely extending wood bars 14 and 15. Secured to and mounted on the platform supporting members 10, 11, 12 and 13 is a quadrantal platform 16. Adjustably supporting the grassward end of the platform 16 is a grain wheel 17. Any well known adjustable mechanism 18 may be employed for adjusting the platform 16 on the grain wheel 17 relative to the ground.

For the purposes of illustrating my invention, I have shown a gathering mechanism of the horizontal revolving four-arm type but it will be understood, of course, that any form of gathering mechanism, such for instance as a revolving reel or reciprocating rake, may be employed. The construction here employed comprises a rake 19 secured to an arm 20 mounted in an arm socket 21. The arm socket is pivotally mounted in a revolving disk 22. While I have only shown one of these arms, it will be understood that four of these arms are positioned at right angles with respect to each other. The mechanism for driving these arms comprises a gear 23 fixed to the disk 22 and in mesh with a pinion 24 which is secured to a shaft 25 journaled in the main frame 5. Secured to the rear end of the shaft 25 is a beveled gear 26 which in turn is operatively driven by a beveled pinion 27. The pinion 27 is fixed to a shaft 28 rotatably mounted in the main frame 5. The stubbleward end of the shaft 28 has secured thereto a gear 29 which in turn is operatively driven by a main drive gear 30 secured to the traction wheel 6 of the harvester. The mechanism thus described is the power drive mechanism ordinarily employed in driving the gathering mechanism in this type of a harvester and this construction per se does not form any part of the present invention.

My improved floating cutting mechanism comprises a cutter bar 31 provided with the usual knife guards 32 spaced at regular intervals throughout the length of the cutter bar. Secured to the rear of the cutter bar is an angle member 33.

The mechanism which permits the cutting mechanism to follow depressions or irregularities on the surface of the ground independently of the position of the platform 16 of the harvester, comprises forwardly extending arms 34 pivoted at 35 to brackets 36 secured to the wood bars 14 and 15. The forward ends of the arms 34 are secured to the cutting mechanism by means of bolts 37. The rearward ends of the arms 34 are provided with upwardly turned portions 38. These portions 38 are turned substantially at right angles to the main body portion of the arms 34 and are provided with apertures 39 which are adapted to receive a pin 40. The cutting mechanism is balanced or resiliently maintained in the floating position shown in Fig. 2 by means of adjustable extension springs 41 having their forward ends connected to the pins 40 and their rearward ends adjustably connected by means of bolts 42 to the platform supporting member 11. Operatively mounted on the cutter bar 31 and extending into the guards 32 is the usual reciprocating knife 43. The knife 43 is driven by a reciprocating pitman connection 44 which in turn derives its power from flywheel 45. The fly-wheel 45 is operatively driven by a shaft 46 which in turn is driven by the shaft 28 through the medium of the beveled gear and pinions 47 and 48 respectively.

In the operation of the above described device, it will be understood that the platform may be adjusted on the main wheel 6 and on the grain wheel 17 to any desired position but preferably to the position in which the cutting mechanism rests upon the ground. Then as the harvester is drawn over the ground and irregularities in the surface of the ground are encountered, the flexibility of the cutting mechanism, by reason of its pivotal connection to the platform together with the resilient spring connections 41, will permit the cutting mechanism to yield in a manner to conform to the surface of the ground independently of the position or movement of the platform. As the crop is cut by the floating cutting mechanism, the raking mechanism 19 of the revolving gathering mechanism will convey the crop from the cutter bar to the platform where it is conveyed by means of the said raking mechanism through substantially an angular distance of 90 degrees and deposited at the rear of the harvester.

While I have illustrated and described my improved floating cutting mechanism used in connection with this type of harvester, it will be understood that the same is capable of use with any type of platform or gathering mechanism in which it is desired to have the cutting mechanism cut the crop close to the ground independently of the position of the platform.

In the above specification, I have described my invention in the form shown herein but it will be understood that the same is capable of modification and that modification may be employed without departing from the spirit and scope of the invention as expressed in the following claims.

What I claim as my invention and desire to secure by Letters Patent is:

1. In a harvester, the combination of a frame, a platform thereon, a cutting mechanism connected to the platform, and a resilient connection beneath the frame from the platform to the cutting mechanism for permitting a free floating action of said cutting mechanism.

2. In a harvester, the combination of a frame, a platform thereon, a cutting mechanism, and a pivotal and resilient connection beneath the platform for floatingly mounting the cutting mechanism on the frame.

3. In a harvester, the combination of a frame, a platform thereon, a cutting mechanism connected to the frame and extending in advance of the platform, and resilient means connected to the frame beneath the platform and to the cutting mechanism for permitting a floating action of said cutting mechanism with respect to said platform.

4. In a harvester, the combination of a frame, a platform thereon, a cutting mechanism in advance of the front edge of the platform and pivotally connected by members to the frame on pivots disposed beneath the platform to the rear of its front edge, and resilient means for floatingly mounting said cutting mechanism.

5. In a harvester, a frame, a platform mounted on the frame, a cutting mechanism pivoted to the frame beneath the platform and rearwardly of its front edge, and means beneath the platform for connecting said frame and cutting mechanism in a manner to permit a yielding action of said mechanism with respect to the platform.

6. In a harvester, a frame, a platform mounted on the frame, a plurality of arms pivoted to the frame below the platform and rearwardly of its front edge, a cutting mechanism mounted on the arms adjacent the front end of the platform, and resilient means connected to the frame and to the arms for permitting a floating movement of the cutting mechanism independently of the platform.

7. In a harvester, a frame, a platform mounted on the frame, a cutting mechanism connected to the platform by resilient means disposed beneath and connected to the frame to permit a yielding action thereof independently of the platform, and a power operative connection for driving the cutting mechanism during its yielding movement.

8. In a harvester, a frame, a platform on the frame, a plurality of arms pivoted to the frame beneath the platform, a cutting mechanism supported on the forward ends of the arms, and a yieldable connection from the frame to the arms rearwardly of their pivots.

In testimony whereof I affix my signature.

HERBERT B. SPERRY.

CERTIFICATE OF CORRECTION.

Patent No. 1,659,007.  Granted February 14, 1928, to

HERBERT B. SPERRY.

It is hereby certified that error appears in the printed specification of the above numbered patent requiring correction as follows: Page 2, line 66, claim 1, for the word "frame" read "platform", and line 67, for the word "platform" read "frame"; and that the said Letters Patent should be read with these corrections therein that the same may conform to the record of the case in the Patent Office.

Signed and sealed this 20th day of March, A. D. 1928.

Seal.

M. J. Moore,
Acting Commissioner of Patents.